United States Patent [19]

Padula

[11] Patent Number: 5,664,638
[45] Date of Patent: Sep. 9, 1997

[54] SENSING TILT-COLUMN STEERING SHAFT TORQUE

[75] Inventor: Santo A. Padula, Lake Orion, Mich.

[73] Assignee: Eaton Corporation, Cleveland, Ohio

[21] Appl. No.: 641,456

[22] Filed: Apr. 30, 1996

[51] Int. Cl.⁶ .................................................. B62D 5/04
[52] U.S. Cl. ........................... 180/443; 180/444; 74/484 R
[58] Field of Search .............................. 180/443, 444, 180/446; 280/775; 74/492, 496, 388 PS, 484 R

[56] References Cited

U.S. PATENT DOCUMENTS

| | | | |
|---|---|---|---|
| 4,464,645 | 8/1984 | Norton | 336/135 |
| 4,890,683 | 1/1990 | Matsuda et al. | 180/444 |
| 4,967,858 | 11/1990 | Kotake et al. | 180/444 |
| 4,989,460 | 2/1991 | Mizuno et al. | 73/862.36 |
| 5,010,920 | 4/1991 | Yamamoto | 180/444 |
| 5,454,439 | 10/1995 | Birsching | 180/443 |
| 5,460,235 | 10/1995 | Shimizu | 180/446 |
| 5,511,629 | 4/1996 | Vogel | 180/443 |

*Primary Examiner*—Christopher P. Ellis
*Attorney, Agent, or Firm*—Roger A. Johnston

[57] ABSTRACT

A torque transducer has a circumferentially magnetized sleeve press fitted on the user-tiltable portion of a vehicle steering shaft and disposed axially intermediate the shaft support bearings. A stationary pickup coil is mounted over the sleeve and located with respect to the sleeve by a second pair of bearings. In an alternate embodiment, two circumferentially magnetized, axially spaced sleeves are utilized.

5 Claims, 2 Drawing Sheets

5,664,638

SENSING TILT-COLUMN STEERING SHAFT TORQUE

BACKGROUND OF THE INVENTION

The present invention relates to user adjustable or tiltable steering wheels employed in passenger motor vehicles. Tiltable steering wheels currently employed in passenger motor vehicles commonly employ a user releasable latch which enables pivoting of the steering wheel about a horizontal axis transverse to the vehicle for moving the steering wheel to a position facilitating passenger entry or exit from the driver's position in the vehicle. Tiltable steering wheels have found wide-spread acceptance in passenger vehicles.

It has been desired to provide an electrical indication of the torque or steering effort applied to the steering wheel by the vehicle driver and to employ such an electrical signal for diagnostic and control purposes in the vehicle; one such application being control of a power steering mechanism based, in part, upon a continuous electrical indication of the torque applied to the steering wheel. However, in view of the swivel joint employed in the steering shaft to accommodate the tilting movement of the wheel, it has been found difficult to provide a way or means of sensing the torque in such a tiltable steering wheel and yet provide a reliable electrical signal indication of the applied torque to the wheel. It has long been desired to particularly find a way or means of providing an electric signal indicative of torque applied to the steering wheel by the driver in a manner which is simple, reliable and low in cost and easy to install on the steering wheel shaft during assembly of the tiltable steering wheel mechanism in the vehicle during manufacturing.

SUMMARY OF THE INVENTION

It is an object of the present invention to provide an electrical signal continuously indicative of the torque applied to a vehicle steering wheel shaft by the driver during operation of the vehicle; and, it is a further object of the invention to provide such an electrical signal in a vehicle equipped with a tiltable steering wheel.

The present invention provides a magnetoelastic active element in the form of a sleeve attached, and preferably press-fitted, onto the steering shaft between the journal bearings for the upper or tiltable portion of the steering shaft. A pick up coil is mounted over the sleeve and is located by a pair of bearings which straddle the sleeve. In the preferred practice, the sleeve is circumferentially magnetized; and, in an alternative embodiment a pair of sleeves may be employed spaced axially on the steering shaft.

DETAILED DESCRIPTION

Figure 1:
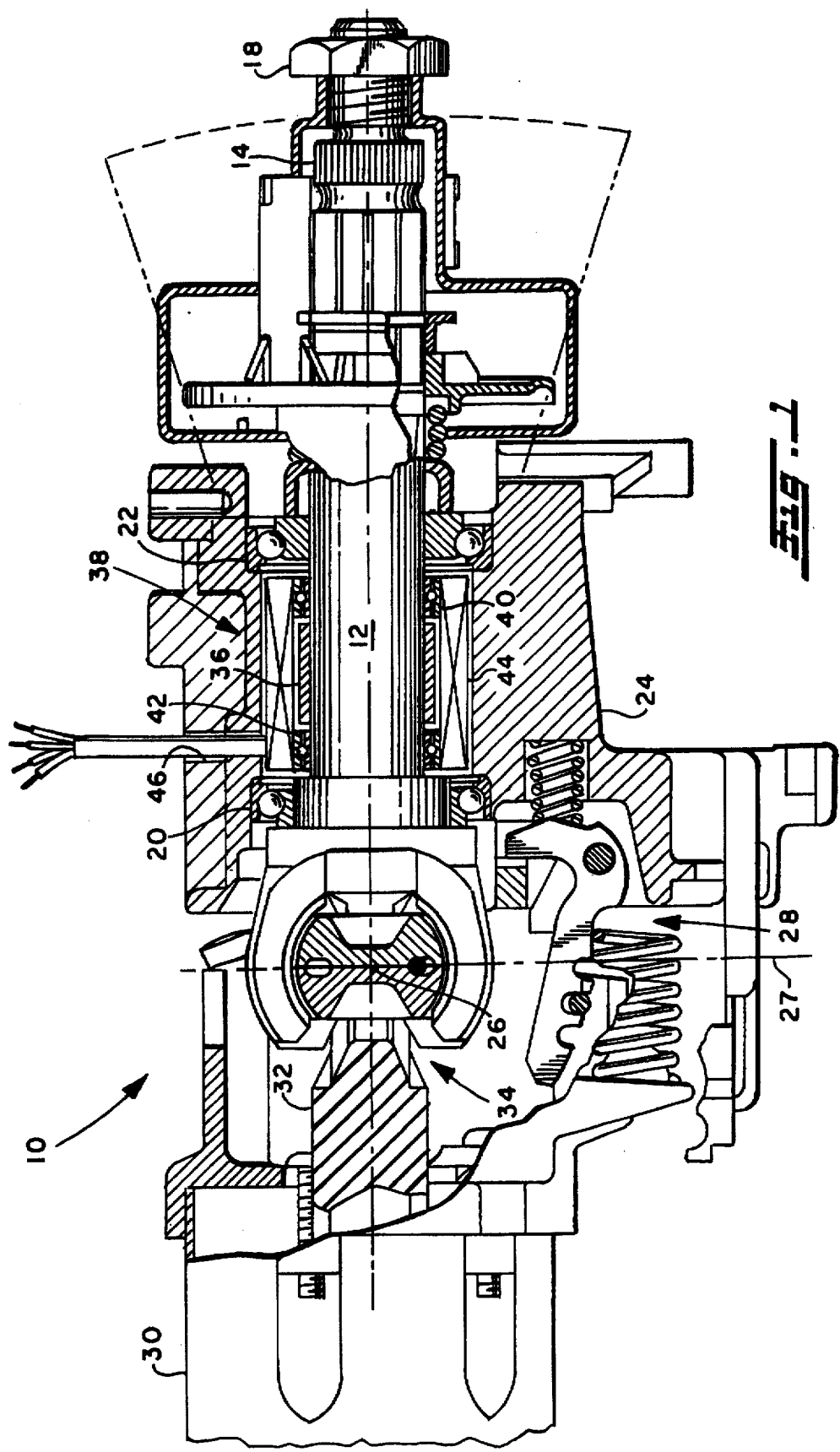
FIG. 1 is a cross-section taken vertically through the steering shaft axis of a tilt wheel steering mechanism; and, FIG. 2 is an enlarged portion of a view similar to FIG. 1 of another embodiment of the invention.

Referring to FIG. 1, a tiltable steering wheel assembly is indicated generally at 10 and has an upper steering shaft 12 which has the upper end thereof splined at 14 and threaded for receiving thereon a steering wheel hub (not shown) which is retained by nut 18. Upper steering shaft 12 is journalled in a pair of axially spaced bearings 20, 22 disposed in an upper, tiltable, support column 24. The tiltable support column structure 24 is mounted on a lower stationary support column 30 provided on the vehicle body structure (not shown).

The upper support column 24 pivots about an axis extending horizontally and transversely of the vehicle and thus perpendicular to the picture plane in FIG. 1 and located as denoted by reference numeral 26; it being understood that axis 26 is perpendicular to the dashed line 27 and intersects same. A user releasable latch mechanism indicated generally at 28 enables the user to latch the upper steering shaft 12 in any of several tilt positions indicated between the dashed outlines in FIG. 1.

Lower steering column section 30, which is rigidly attached to the vehicle's body structure, supports a lower steering shaft 32 which is journalled for rotation therein. Shaft 32 has its upper end connected to the lower end of upper steering shaft 12 by a suitable swivel joint indicated generally at 34 such that the upper steering shaft 12 may be tilted about axis 26 with respect to lower shaft 32 but with torque transmitting connection maintained therebetween.

Referring to FIG. 1, upper steering shaft 12 has provided thereon and attached rigidly thereto a torque sensor indicated generally at 38 which has a magnetoelastic active element in the form of a circumferentially magnetized annular sleeve 36 known in the art and which is preferably press-fitted onto the shaft 12 intermediate bearings 20, 22. The magnetic sleeve 36 is disposed between a pair of bearings 42, 40 disposed on axially opposite sides of the sleeve 36 with the inner races of bearings 40, 42 registered on shaft 12. A magnetic pick up coil 44 is registered on the outer races of bearings 40, 42; and, coil 44 has electrical leads extending outwardly through support 24 in an aperture 46 formed therein. The coil thus remains stationary and is located on and journalled on the upper steering shaft 12 for accurate location with respect to the magnetized sleeve 36.

In operation when torque is applied to shaft 12 through steering wheel hub 16 by the vehicle operator, the torsional strain in shaft 12 in the region between bearings 20, 22 is transmitted to sleeve 36 causing disturbance of the lines of the magnetic field and the resultant distortion creates an electrically detectable current in coil 44 which may be remotely processed to indicate the torque applied to shaft 12.

Figure 2:
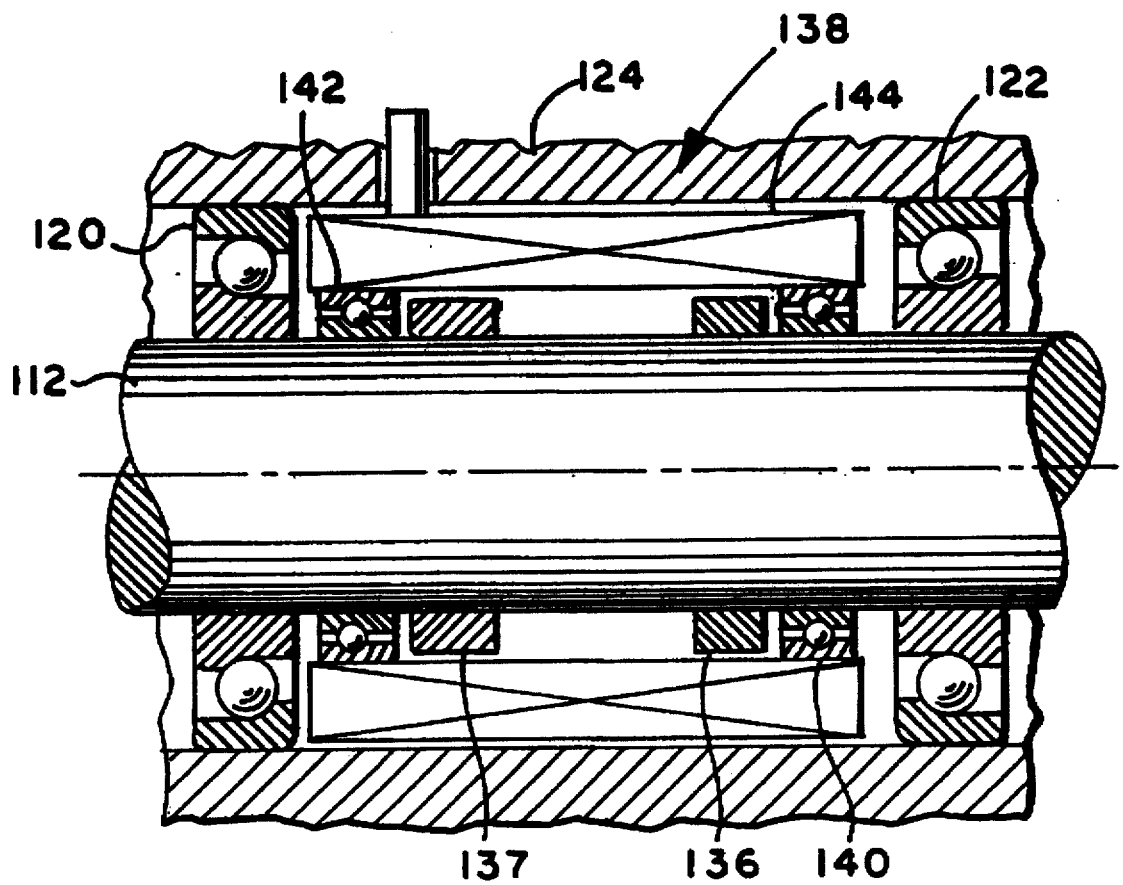

Referring to FIG. 2, an alternative embodiment of the torque sensor installation in a tiltable steering wheel and is indicated generally at 138 and includes an upper steering shaft 112 journalled in bearings 120, 122 assembled in upper support column structure 124 which is tiltably mounted on a lower support column. Sensor 138 has a pair of circumferentially magnetized magnetoelastic rings 136, 137 press-fitted on shaft 112 in axially spaced arrangement. An electrical pick up coil 144 is disposed thereover and journalled on shaft 112 by suitable bearings 140, 142. In the embodiment of FIG. 2 the coil 144 is operative to sense the differential torsional strain between the magnetized elements 136, 137 in a manner similar to the embodiment of FIG. 1.

The present invention thus provides a simple, reliable and low cost way of instrumenting a tiltable steering column assembly for providing an electrical signal indicative of the torque applied to the steering shaft by the vehicle operator.

Although the invention has hereinabove been described with respect to the illustrated embodiments, it will be understood that the invention is capable of modification and variation and is limited only by the scope of the following claims.

I claim:

1. A tiltable steering column assembly for a vehicle comprising:

(a) lower support column means rigidly mounted on the vehicle structure;

(b) upper support column means tiltably mounted on the lower support column for user selected pivotal movement about a generally horizontal axis transverse to the vehicle;

(c) a lower steering shaft received through said lower support column;

(d) an upper steering shaft received through said upper support column means and journalled thereon for rotation in a pair of axially spaced bearings;

(e) swivel joint means interconnecting said upper and lower steering shaft and operative for transmitting torque therebetween;

(f) a magneto elastic active element fixedly attached to said upper shaft at a location axially intermediate said pair of bearings, said element operative to be torsionally strained by application of torque to said upper shaft; and (g) electromagnetic means disposed on said upper column means adjacent said magnetic elastic element and operative to detect torsional strain of said element and provide an electrical signal indicative thereof.

2. The assembly defined in claim 1, wherein said magneto elastic element comprises at least one circumferentially magnetized sleeve press-fitted onto said upper steering shaft.

3. The assembly defined in claim 1, wherein said electromagnetic means includes a coiled conductor.

4. The assembly defined in claim 1, wherein said magneto elastic active element comprises a pair of axially spaced annular members.

5. The assembly defined in claim 1, wherein said magneto elastic element has an annular configuration and is magnetized in the circumferential direction.

\* \* \* \* \*